United States Patent
Oates et al.

(10) Patent No.: US 10,455,807 B2
(45) Date of Patent: Oct. 29, 2019

(54) PET FOUNTAINS

(71) Applicant: PET MATE LIMITED, Hersham, Surrey (GB)

(72) Inventors: Jeremy Oates, Middlesex (GB); Christopher Peter Kirk, Godalming (GB)

(73) Assignee: Pet Mate Ltd., Surrey (GB)

( * ) Notice: Subject to any disclaimer, the term of this patent is extended or adjusted under 35 U.S.C. 154(b) by 21 days.

(21) Appl. No.: 15/444,715

(22) Filed: Feb. 28, 2017

(65) Prior Publication Data
US 2017/0245465 A1   Aug. 31, 2017

(30) Foreign Application Priority Data
Feb. 29, 2016 (GB) .................................. 1603439.9

(51) Int. Cl.
*A01K 7/00* (2006.01)
*B65D 21/02* (2006.01)

(52) U.S. Cl.
CPC ............ *A01K 7/00* (2013.01); *B65D 21/0234* (2013.01)

(58) Field of Classification Search
CPC .................................... A01K 7/00; A01K 7/02
See application file for complete search history.

(56) References Cited

U.S. PATENT DOCUMENTS

| | | | | |
|---|---|---|---|---|
| 4,896,627 A | * | 1/1990 | Riddell | A01K 5/0142 119/51.5 |
| D704,391 S | * | 5/2014 | Tan | D30/132 |
| D709,654 S | * | 7/2014 | Lipscomb | D30/121 |
| 8,763,557 B2 | * | 7/2014 | Lipscomb | A01K 7/02 119/74 |
| 8,813,683 B2 | * | 8/2014 | Lipscomb | A01K 45/002 119/74 |
| 8,985,054 B2 | * | 3/2015 | Lipscomb | A01K 45/002 119/74 |
| 9,826,712 B2 | * | 11/2017 | Lipscomb | A01K 45/002 |
| 2009/0056633 A1 | * | 3/2009 | McDaniel | A01K 5/0142 119/51.5 |
| 2012/0137979 A1 | * | 6/2012 | Lipscomb | A01K 7/02 119/74 |
| 2013/0087102 A1 | * | 4/2013 | Lipscomb | A01K 7/02 119/74 |
| 2015/0196007 A1 | * | 7/2015 | Lipscomb | A01K 7/02 119/74 |

FOREIGN PATENT DOCUMENTS

| | | | |
|---|---|---|---|
| CN | 203985484 U | 12/2014 | |
| GB | 2458173 A | 9/2009 | |
| WO | WO-2007055973 A2 | * 5/2007 | ............ A01K 5/0114 |

OTHER PUBLICATIONS

UK Search Report of Application Serial No. GB1603439.9 dated Aug. 16, 2016, 3 pages.

* cited by examiner

*Primary Examiner* — Monica L Williams
*Assistant Examiner* — Aaron M Rodziwicz
(74) *Attorney, Agent, or Firm* — Fay Sharpe LLP

(57) ABSTRACT

A pet fountain comprises an upper bowl, a base including a lower bowl. The upper bowl can be secured to the base so that it is elevated above the level of the base. The lower bowl is sufficiently large to accommodate the upper bowl when the upper bowl is not secured to the base. The internal space of the lower bowl has at least one span that is slightly greater than the longest measurement across the upper bowl.

11 Claims, 9 Drawing Sheets

PET FOUNTAINS

CROSS-REFERENCE TO RELATED APPLICATIONS

This application claims priority to, and the benefit of, Great Britain Patent Application No. GB 1603439.9, filed Feb. 29, 2016, the entirety of which is hereby incorporated by reference as if fully set forth herein.

The present specification relates to pet fountains, that is, articles that provide pets with circulating water for drinking.

A common type of pet fountain comprises an upper bowl which is raised by sidewalls above a wider lower bowl. The upper bowl is supplied by water via a spout, and this water flows out of the upper bowl and down the walls of the upper bowl (usually down a shaped spillway) into the lower bowl. Water from the lower bowl is recirculated from the lower bowl through a filter to the spout in the upper bowl. One such design is shown in GB2458173.

The provision of water at different levels allows pets to drink from a level which suits them. It does mean though that a pet fountain may be a bulky object, making it inconvenient to ship The object of the present invention is to conveniently reduce the volume occupied by the pet fountain. The reduced volume may be advantageous for shipping, postage, delivery or storage, and for display in retail outlets that where shelf space may be limited or highly valued.

According to the present invention, there is provided a bird feeder as defined in claim 1.

The invention will now be described, by way of example, with reference to the drawings, of which FIG. 1 is a perspective view of the assembled pet fountain;

Figure 1:
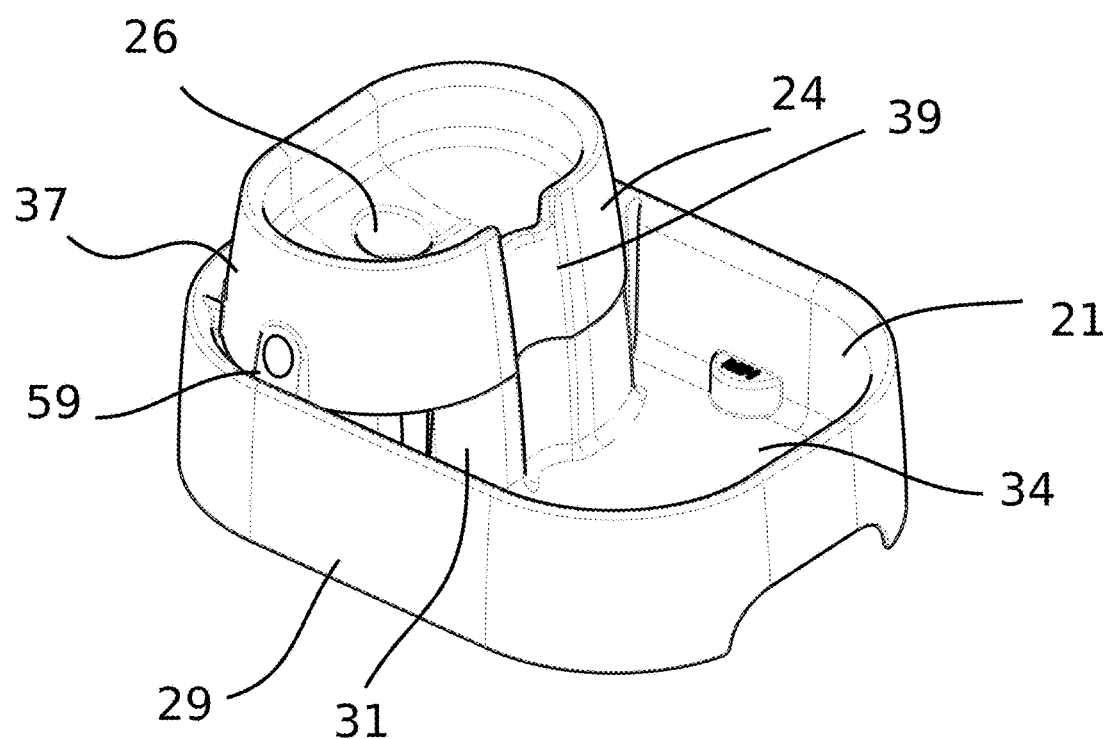

Referring to FIG. 1, a pet fountain 20 comprises an upper bowl 24 which occupies an elevated position above a base 21, and is surrounded (when the pet fountain 20 is considered in plan) by the wall 29 of the base 21.

Figure 2:
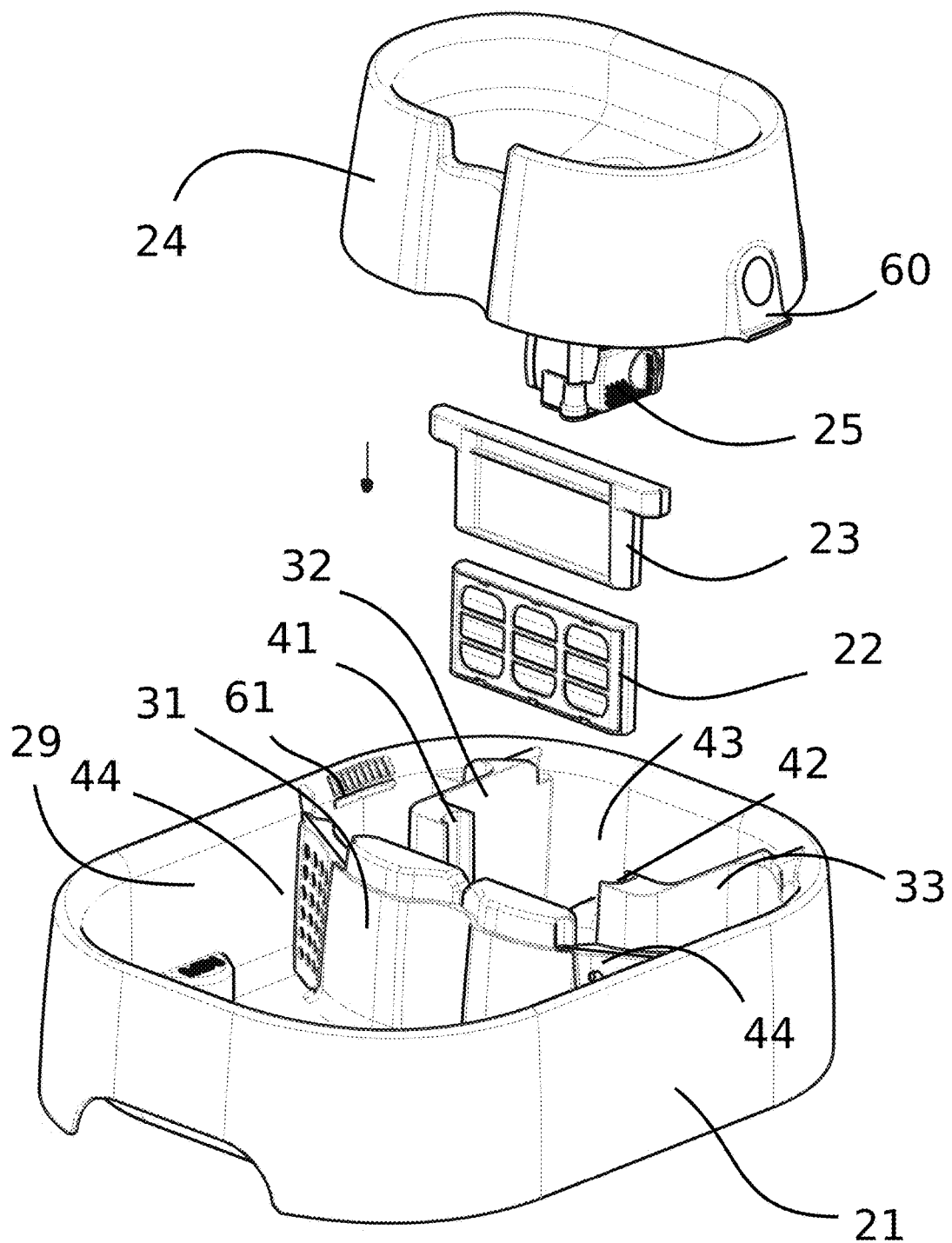
FIG. 2 is an exploded perspective view of the pet fountain.

Referring also to FIG. 2, the base includes a carrier wall 31 and internal support walls 32, 33 which project up from a substantially horizontal floor 34 of the base 21. The upper bowl 24 sits upon and fits against the surfaces of the carrier wall 31 and internal support walls 32, 33 of the base 21. Additional abutting surfaces may be provided between the upper bowl 24 and the base 21. The upper bowl 24 includes projecting clips 59, 60 which engage with corresponding indents 61, 62 provided on the wall 29 of the base 21. The upper bowl 24 may also include slots 63, 64 which secure in a snap fit manner to lugs 65, 66 on the base 21 (visible in FIG. 7).

The carrier wall 31 and upper bowl 24 are shaped so that there is a spillway leading from the upper bowl 24. The carrier wall 31, floor 34 and much of the wall 29 of the base 21 define a volume that forms a lower bowl 30, and the spout 26 allows water to flow from the upper bowl 24 into this lower bowl 30. A pet may drink from either the upper bowl 24 or lower bowl 30 according to its size and inclination.

Two internal support walls 32, 33 project upwards from the base 21. These internal support walls 32, 33, together with the carrier wall 31, engage with and support the upper bowl 24. The internal support walls 32, 33, together with part of the wall 29 also form a compartment 43. The internal support walls 32, 33 include grooves 41, 42, which accept a filter 22 and flow shutter 23 (a filter, or combined filter and shutter may be used instead of a flow shutter 23). A pump 25 is attached to the upper bowl 24, and when the upper bowl 24 is placed on the internal support walls 32, 33 and carrier wall 31, the pump 25 is substantially enclosed within this compartment 43. When a sufficient amount of water is placed in the lower bowl 30, water can flow through perforated barriers 44 located between the wall 29 and the carrier wall 31, and into the compartment 43 through the filter 22, with the rate being controlled by the flow shutter 23. The pump 25 may then be operated to draw water from the compartment 43 up though the spout 26, where it collects in the upper bowl 24 until the level exceeds the top of the spillway 39 and flows down into the lower bowl 30.

Figure 3:
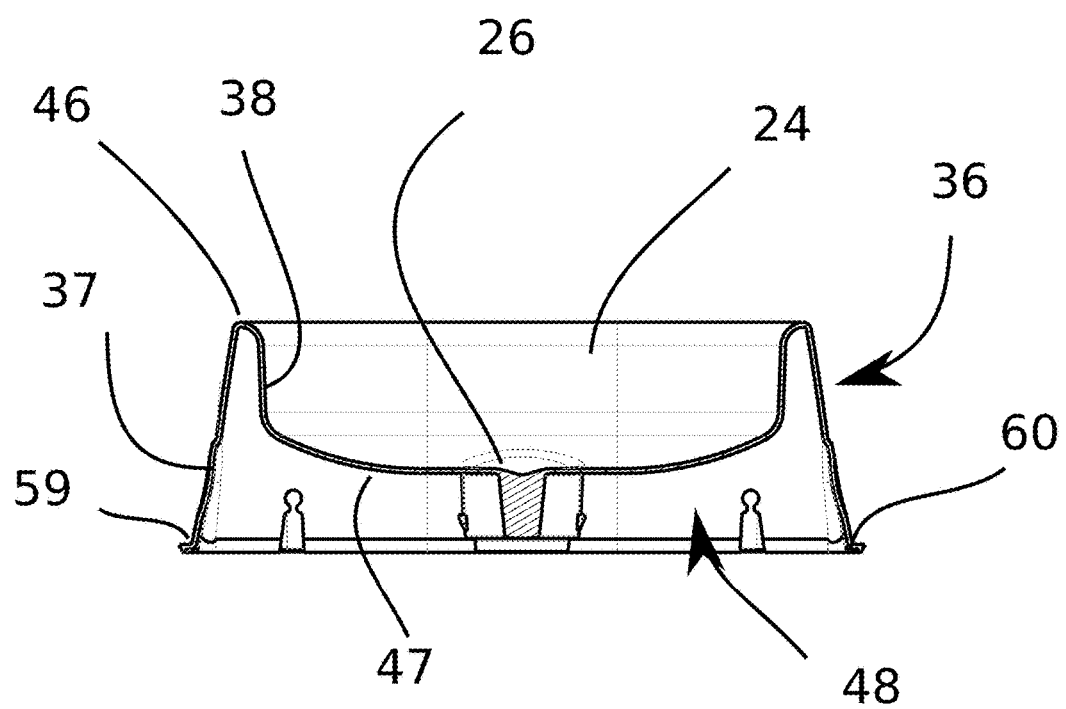
FIG. 3 is a sectional view of part of the pet fountain.

Referring to FIG. 3, the upper bowl is substantially formed from a shaped thin skin, so that the wall 36 of the upper bowl 24 includes an outer skin 37 and an inner skin 38, which meet at a curved upper rim 46. The inner skin 38 then meets a shallow depression which forms the bottom 47 of the upper bowl 24. The bowl may also feature thicker portions around the spout 26 and spillway 39 or for other structural purposes. This configuration means that a cavity 48 is provided between the outer skin 37 and the inner skin 38, and beneath the bottom 47 of the upper bowl 24, since the outer skin 37 extends beneath the level of the bottom 47.

The provision of the cavity 48 allows the upper bowl 24 to be placed upon the upwardly projecting carrier wall 31 and internal support walls 32, 33 so that the upper bowl 24 rests upon and engages with the carrier wall 31 and internal support walls 32, 33. Additional securement means may be provided, such as snap fit or interference fit parts.

Figure 4:
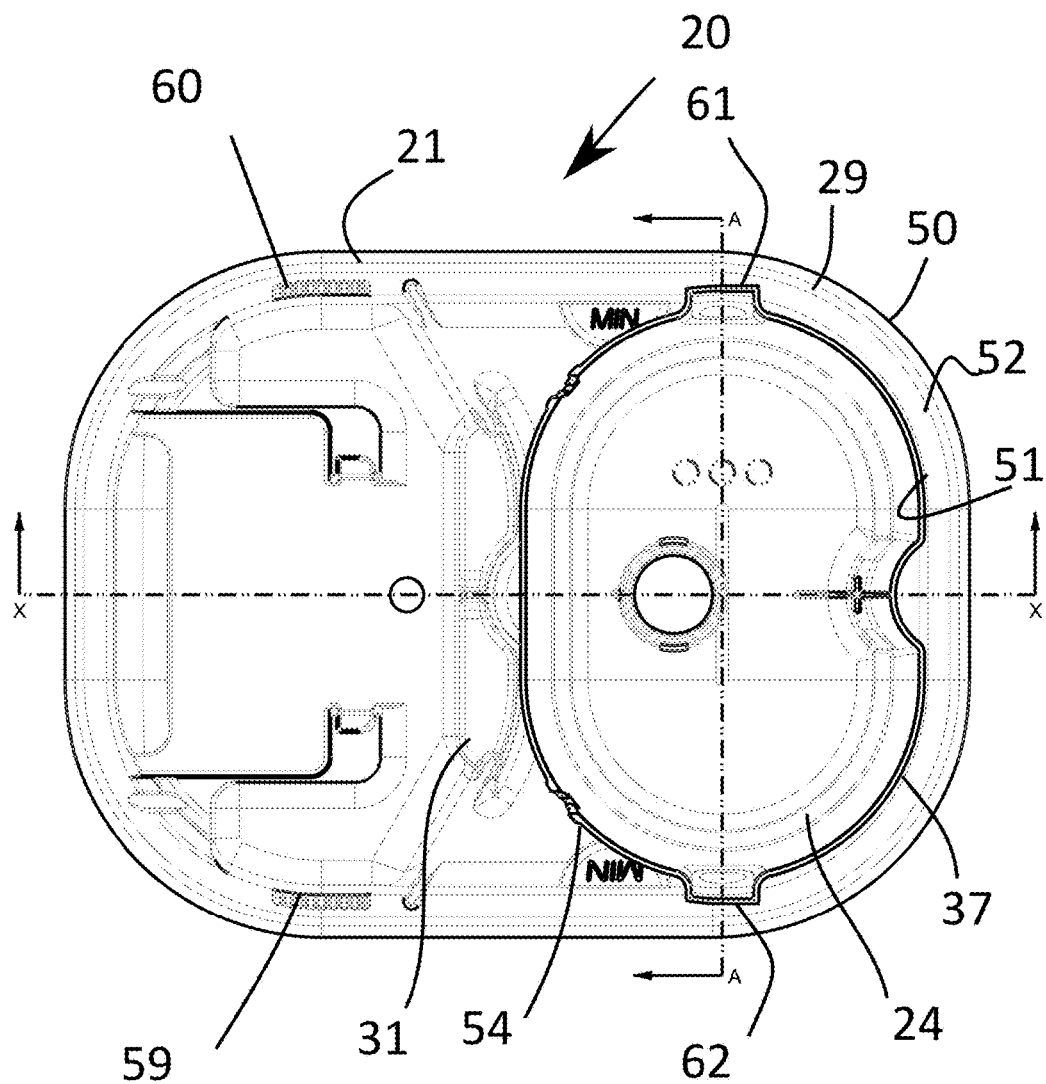
FIG. 4 is a plan view of the packed pet fountain.
Figure 5:
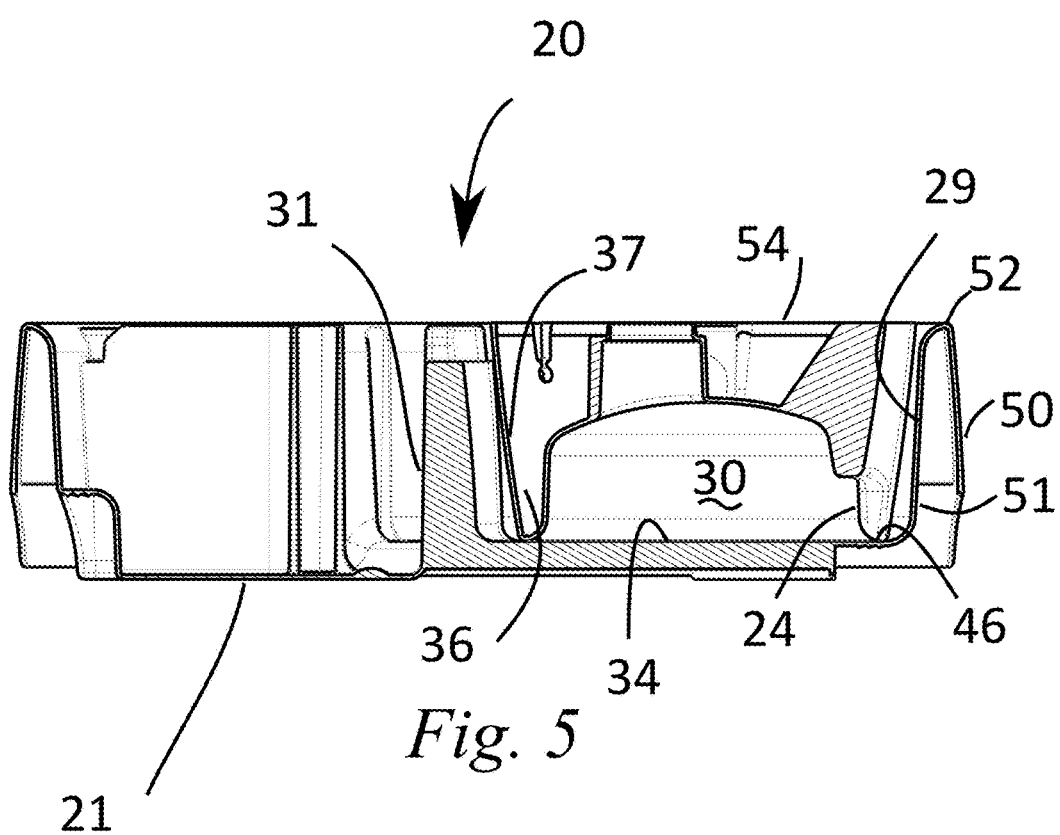
FIG. 5 is a longitudinal sectional view of the packed pet fountain.
Figure 6:
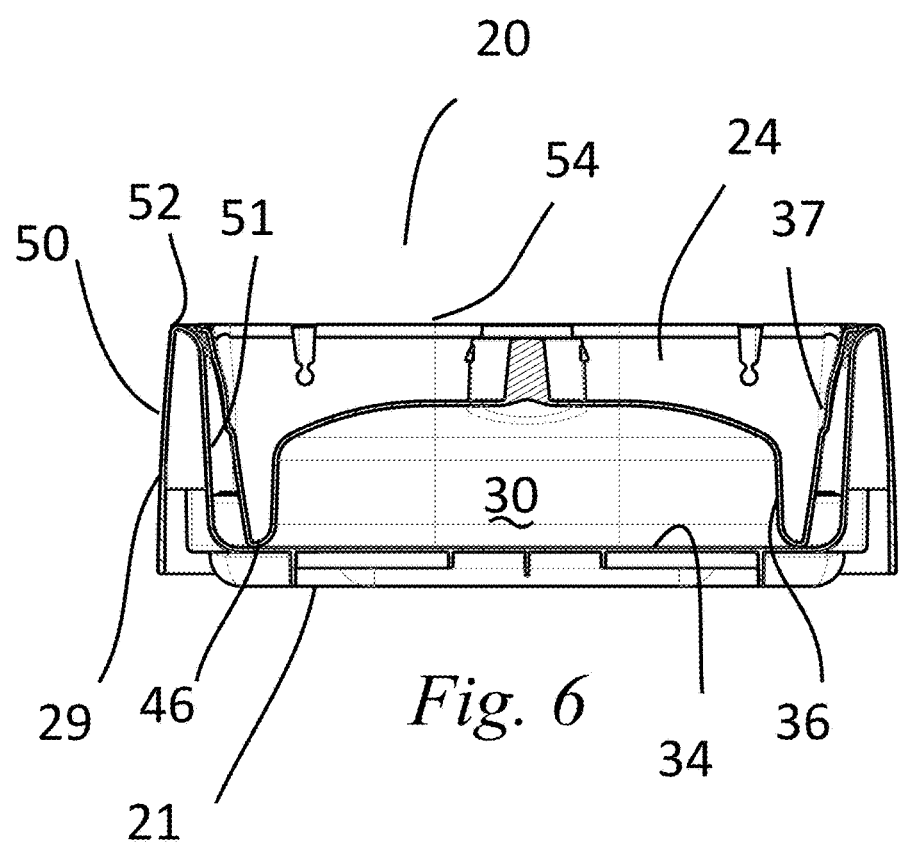
FIG. 6 is a cross sectional view of the packed pet fountain.

Referring to FIGS. 4 to 6, the shape upper bowl 24, when inverted, generally corresponds to the shape of the lower bowl 30, but having slightly smaller dimensions. In a similar manner to the upper bowl 24, the base 21 may be constructed in a substantially monocoque form comprising a thin shaped skin, though having thickened portions for structural and stability reasons, or to provide particular functionality. The wall 29 of the base 21 is generally comprised of an inner skin 51 and outer skin 50, meeting at an upper rim 52, and the inner skin 51 curving to meet the floor 34 of the base 21.

The upper bowl 24 may then be inverted and placed in the lower bowl 30, so that the outer skin 37 of the upper bowl 24 fits inside the inner skin 51 of the lower bowl 30 and the side of the carrier wall 31 that defines one side of the lower bowl 30. The width and length of the inner volume of the lower bowl 30 are sufficiently greater than the upper bowl 24 so that the upper bowl 24 may be easily placed in the lower bowl 30, but ideally the width and breadth are not so much greater that the upper bowl 24 can move about and can be relatively constrained. The base 21, when considered in plan, is generally rectangular, but whose corners are curved. The upper bowl 24 is substantially stadium or discorectangular in shape, and the curvature of the outer skin 37 upper bowl 24 and the inner skin 51 of the lower bowl 30 correspond, so that one long side of the upper bowl 24 conforms to and fits with the one side of the lower bowl 30 as shown. However, it will be realised that other shapes may be used, provided that the shape of the upper bowl, when considered in plan, is substantially a reflection of the shape of the lower bowl. With some shapes, the upper bowl's orientation could be changed (i.e. the shape, when considered in plan could be rotated) as well as turned upside-down before being fitted in the lower bowl, depending on the shapes chosen. The upper and lower bowls need not be regular or symmetrical shapes; however, the illustrated shape, the body of the fountain as a whole having flat sides and rounded corners, achieves a holds a good volume of water for the space occupied and material used, and can be conveniently placed against a wall, and the rounded corners appeal to pets.

Ideally, the upper bowl fits in the lower bowl with a snug fit; usually a gap in the order of 2% of the relevant measurement, as a smaller gap than this may not fit due to variations in shrinkage and distortion of injection moulded parts.

The outer skin 37 of the upper bowl 24 is inclined from the vertical, so that the wall 36 of the upper bowl 24 tapers upwards (when not inverted). The wall 29 also tapers upwards, though to a lesser degree. When inverted, these respective inclinations allows the upper bowl 24 to be accommodated within the lower bowl 30. The carrier wall 31 also tapers, to a similar degree to the upper bowl 24 (since it engages underneath the upper bowl 24 when the fountain is assembled), and again does not impede the placing of the inverted upper bowl 24 in the lower bowl 30 but rather tends to help constrain the lower bowl 30 in position.

The height of the upper bowl 24, that is, the distance from the upper rim 46 to the lower edge 54 of the outer skin 37, similar too (and ideally equal or slightly less) than the depth of the lower bowl 30 (that is, the distance from the upper rim 52 to the floor 34 of the lower bowl 30).

Figure 7:
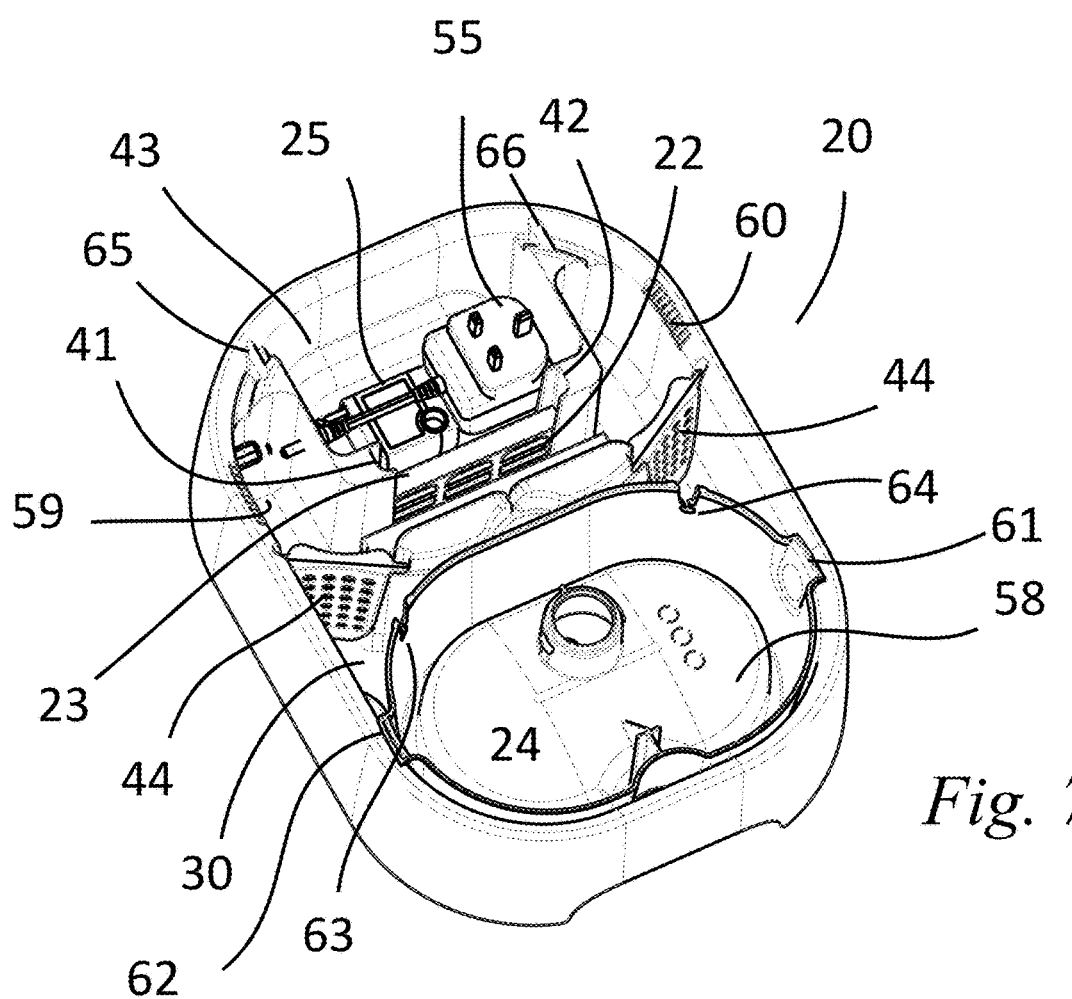
FIG. 7 is a perspective view of the disassembled and packed pet fountain.

In this manner, it will be seen that when the pet fountain 20 is being transported or stored, the upper bowl 24 may be conveniently stowed in the lower bowl 30 of the base 21. Referring to FIG. 7, when the upper bowl 24 is stowed in the lower bowl 30, there is sufficient room in the compartment 43 to place the pump 25 and a power adaptor 55 for use with the pump. A tube 57 (visible in FIG. 8) may be stowed in the volume of the underside 58 of the upper bowl 24. The filter 22 and flow shutter 23 may be conveniently housed in their assembled positions (within the grooves 41, 42 of the compartment 43) when the upper bowl 24 pump 25 and power adaptor 55 are stowed. Likewise, the perforated barriers 44 may be housed in their final assembled positions even when the pet fountain 20 is disassembled for transport or storage.

Figure 8:
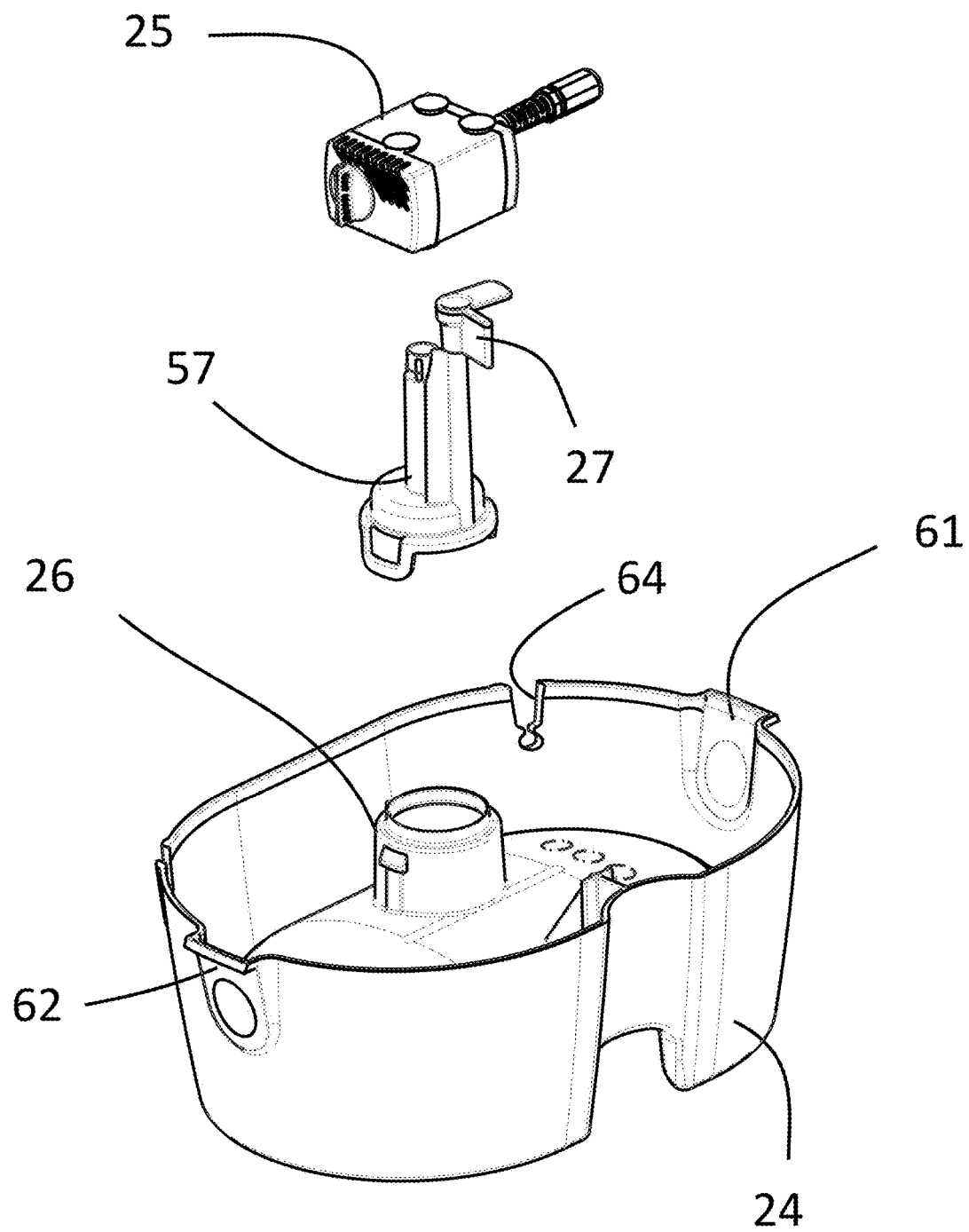
FIG. 8 is a perspective view part of the pet fountain being assembled.
Figure 9:
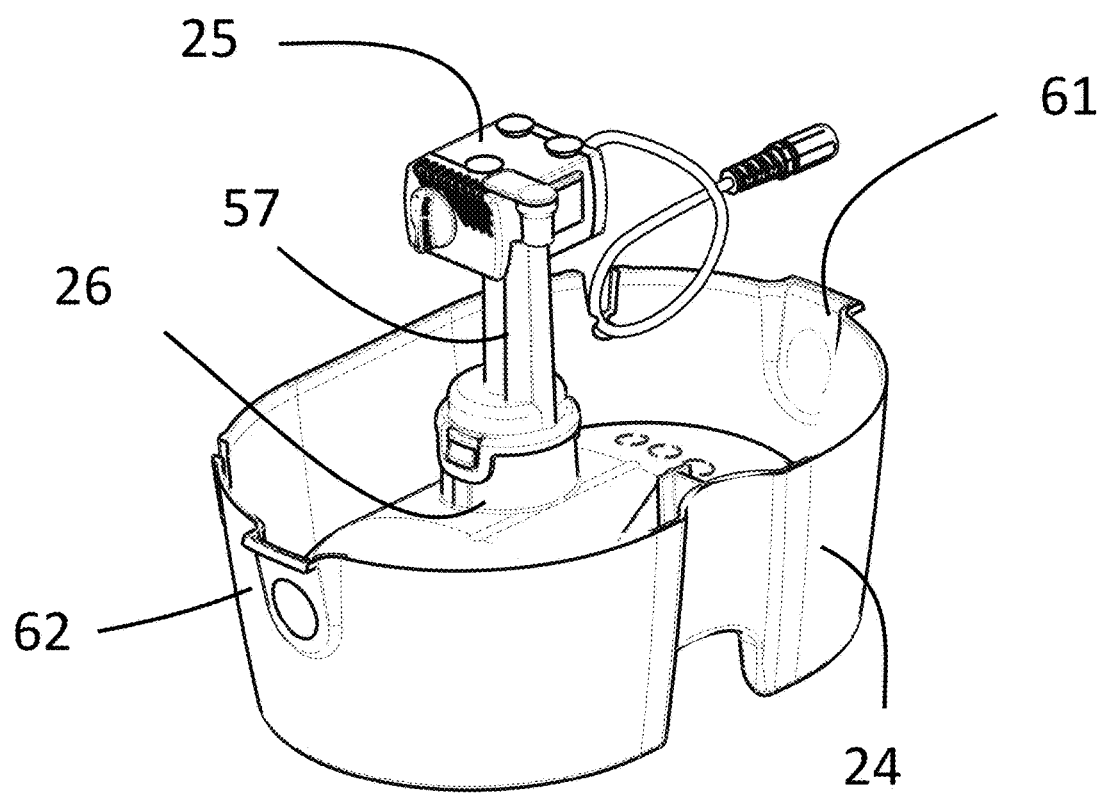
FIG. 9 is a perspective view part of the pet fountain having been partially assembled.

Referring to FIGS. 8 and 9, to assemble the pet fountain 20, the tube 57 is fitted to the spout 26 of the upper bowl 24 and the pump 25 fitted to the tube 57 by rotating a retainer 27, conveniently while the upper bowl 24 is inverted. Referring back also to FIG. 2, after the filter 22 and flow shutter 23 are placed within the grooves 41, 42 of the compartment 43, and the perforated barriers 44 placed in their position between the wall 29 of the lower bowl 30 and the carrier wall 31, the power adaptor 55 can be attached to the pump 25 and the assembled pump 25, tube 57 and upper bowl 24 lowered into position, so that the underside 58 of the upper bowl 24 engages with the carrier wall 31 and internal support walls 32, 33 as previously described. The clips 59, 60 on the outer skin 37 of the upper bowl 24 engage with the indents 61, 62 located on the wall 29 of the base 21 in a snap fit manner, so that the upper bowl 24 cannot be accidentally removed from the base 21. To disassemble the devise, upper parts of the clips 59, 60 may be simultaneously pressed by the user to release the upper bowl 24, and the other steps described here simply reversed.

The invention claimed is:

1. A pet fountain comprising
an upper bowl;
a base including a lower bowl, and a carrier wall that separates the lower bowl into first and second side regions;
the upper bowl being removeably securable to the base and the carrier wall so that the upper bowl is elevated above the level of the base and above the first side region; and
wherein the second side region of the lower bowl is sufficiently large to accommodate the upper bowl when the upper bowl is not secured to the base.

2. A pet fountain according to claim 1, wherein an internal space of the second side region of the lower bowl has at least one span that is slightly greater than the longest measurement across the upper bowl.

3. A pet fountain according to claim 2, wherein the internal space of the second side region of the lower bowl has a second span that is slightly greater than a distance measured perpendicularly to the longest measurement across the upper bowl, so that the upper bowl is relatively constrained when nested with the lower bowl.

4. A pet fountain according to claim 1, wherein part of the second side region of an internal wall of the lower bowl has a corresponding shape to at least part of the upper bowl.

5. A pet fountain according to claim 1, wherein the upper bowl is adapted to be accommodated into the second side region of the lower bowl when oriented upside down from an orientation of the upper bowl when intended to be used.

6. A pet fountain according to claim 1, wherein an outer surface of walls of the upper bowl are inclined.

7. A pet fountain according to claim 1, wherein an inner surface of walls of the second side region of the lower bowl are inclined in a substantially complimentary manner.

8. A pet fountain according to claim 1, wherein the base includes at least one upwardly projecting feature having an outer surface, and the upper bowl has an outer wall, such that the upper bowl rests upon the at least one upwardly projecting feature when the pet fountain is assembled, such that at least part of the outer wall of the upper bowl overlaps at least part of the outer surface of the upwardly projecting feature align to present a substantially continuous surface where the upper bowl and the upwardly projecting feature overlap.

9. A pet fountain according to claim 8, wherein the substantially coplanar region includes a channel for water to flow along.

10. A pet fountain according to claim 1, wherein filter grills are included separate from the upper bowl.

11. A pet fountain according to claim 1, wherein the upper bowl includes a tube to carry water from the lower bowl to a spout on the upper bowl, the tube being detachable from the lower bowl and the upper bowl.

\* \* \* \* \*